Sept. 23, 1924.
G. BROULHIET
ELASTIC WHEEL FOR VEHICLES
Filed Sept. 19, 1922
1,509,705
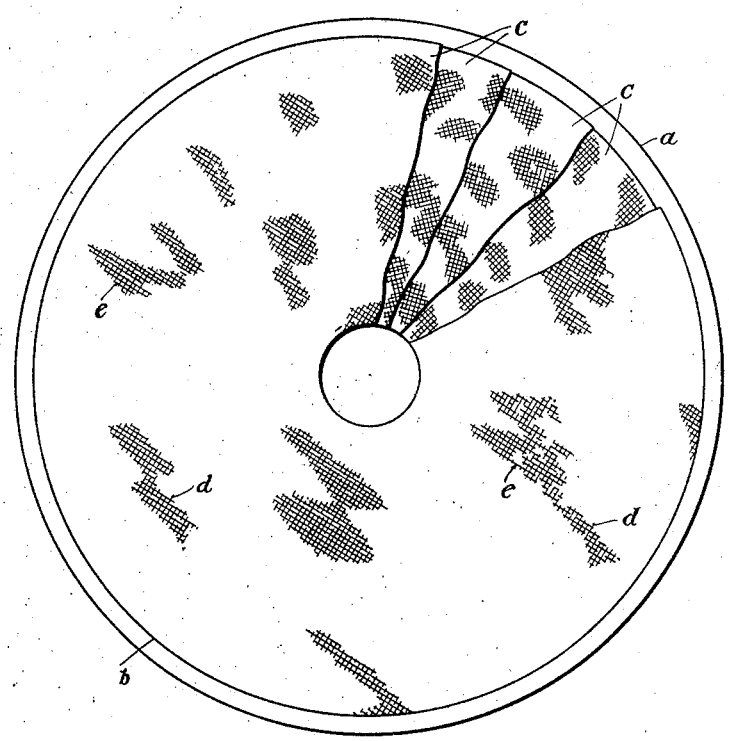
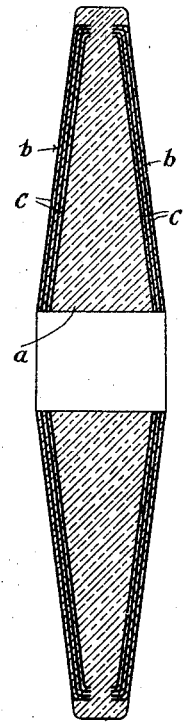
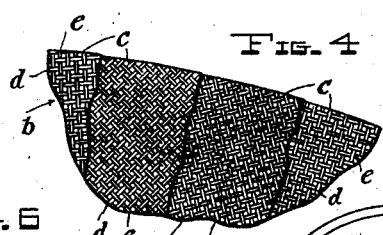
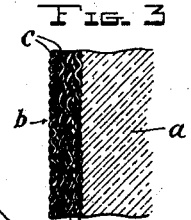
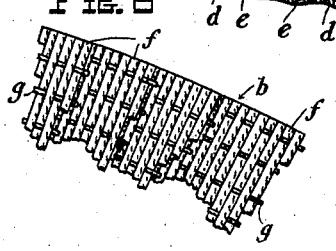
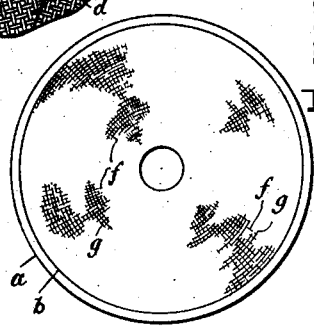
Inventor
Georges Broulhiet,
by
Attorney.

Patented Sept. 23, 1924.

1,509,705

UNITED STATES PATENT OFFICE.

GEORGES BROULHIET, OF ST. ETIENNE, FRANCE.

ELASTIC WHEEL FOR VEHICLES.

Application filed September 19, 1922. Serial No. 589,130.

*To all whom it may concern:*

Be it known that I, GEORGES BROULHIET, a citizen of the French Republic, residing in St. Etienne, France, have invented certain new and useful Improvements in Elastic Wheels for Vehicles, of which the following is a specification.

The invention consists in a wheel of solid caoutchouc of which the elasticity is greatest in the radial direction. It is obvious that a wheel of this type will have a maximum elasticity that the material used will permit, if the radial dimensions of the elastic material are as great as possible. It is necessary in a wheel of this construction that lateral rigidity should be ensured, and consequently the elasticity in the lateral direction must be less than it would be if it was constructed entirely of the elastic material. For this purpose the external surfaces of the elastic material in the plane of the wheel are provided with casings consisting of canvas, cord or other suitable textile material, in which all or some of the fibres are arranged radially.

This arrangement does not detract at all from the vertical flexibility of the wheel but prevents any lateral distortion.

In the accompanying drawing:

Figs. 1 and 2 are, respectively, a vertical section and a side elevation of a wheel embodying the invention, the casing being shown as consisting of ordinary woven canvas;

Figs. 3 and 4 are detail views, on a larger scale, corresponding, respectively, to Figs. 1 and 2;

Fig. 5 shows, in side elevation, a wheel embodying the invention wherein the casing is shown as consisting of woven cord fabric, such as that of which "cord" tires are made; and Fig. 6 is a detail view, on a larger scale, corresponding to Fig. 5.

In the example illustrated in Figs. 1 to 4, the elastic material $a$, preferably of caoutchouc, is provided with casings $b$, $b$, each formed of four layers $c$ of canvas or other textile fabric; the warp threads are shown at $d$ and the weft threads at $e$; the direction of the weft of the material is displaced circumferentially in each layer relatively to the others. In the drawing the casings are composed of four layers but the number would be varied according to the size of the wheel.

There are thus eight sets of textile fibres stretched radially.

The canvas casing may be replaced by cords $f$ arranged radially, as shown in Figs. 5 and 6, other cords $g$ being arranged circumferentially, or the cords $f$ may be arranged like the spokes of a bicycle wheel tangential to a small circle concentric with the centre of the wheel. The textile material stops short at a few centimetres from the rim of the wheel, which on contact with the ground acts as a tyre of solid caoutchouc.

Having thus described the nature of the said invention and the best means I know of carrying the same into practical effect, I claim:—

1. A solid wheel of elastic material having layers of fibrous material secured to the side surfaces thereof to provide lateral rigidity.

2. A wheel according to claim 1 in which at least some of the fibres of the material are arranged radially.

3. A wheel according to claim 1 in which the weft threads of the different layers are relatively displaced.

4. A wheel according to claim 1 in which the layers of fibrous material are secured to the elastic core at points adjacent the rim thereof.

In testimony whereof I have signed my name to this specification.

GEORGES BROULHIET. [L. S.]

In presence of—
CASIMIR GENEST,
J. B. VALLAT.